Dec. 18, 1962 G. M. STEIN ETAL 3,069,643

MAGNETIC CORE STRUCTURE

Filed Dec. 5, 1958 4 Sheets-Sheet 1

WITNESSES

John E. Healy, Jr.

Clement L. McHale

INVENTORS
Gerhard M. Stein &
Theodore R. Specht
BY
A. T. Stratton
ATTORNEY

Dec. 18, 1962 G. M. STEIN ETAL 3,069,643

MAGNETIC CORE STRUCTURE

Filed Dec. 5, 1958 4 Sheets-Sheet 2

Dec. 18, 1962 G. M. STEIN ETAL 3,069,643

MAGNETIC CORE STRUCTURE

Filed Dec. 5, 1958 4 Sheets-Sheet 3

United States Patent Office 3,069,643

Patented Dec. 18, 1962

3,069,643

MAGNETIC CORE STRUCTURE

Gerhard M. Stein and Theodore R. Specht, Sharon, Pa., assignors to Westinghouse Electric Corporation, East Pittsburgh, Pa., a corporation of Pennsylvania Filed Dec. 5, 1958, Ser. No. 778,368

26 Claims. (Cl. 336—217)

This invention relates to magnetic core structures for use in electrical induction apparatus, such as transformers.

In certain types of electrical induction apparatus, such as transformers, a magnetic core structure is sometimes provided including a plurality of stacked layers of laminations formed from magnetic strip material having a preferred direction of orientation lengthwise of said material or parallel to the longitudinal dimension of said material. One conventional type of magnetic core structure, such as disclosed in U.S. Patent No. 2,300,964, issued November 3, 1942, on an application of H. V. Putman, and assigned to the assignee of the present application, employs combination butt and lap joints adjacent to the corners of a substantially rectangular magnetic core structure in which the adjoining edges of the laminations of each layer are cut at an oblique angle with respect to the preferred direction of orientation of the magnetic strip material from which said laminations are formed. A core construction of the latter type is employed to obtain a high permeability of the over-all core structure and low losses associated with said core structure. The combination butt and lap joints at each corner of the core structure disclosed in the Putman patent are obtained by distributing or dividing the major portion of the joints at each corner into substantially two planes which are each disposed at an oblique angle with respect to the direction of orientation of the strip material from which the meeting laminations are formed. A magnetic core of the latter type has several disadvantages which relate to the lower limits of the exciting current and the associated losses which result from such a core construction and to the scrap resulting from the method of punching or cutting the laminations of a conventional core, particularly those of the three-phase type.

In copending application, Serial No. 778,369, filed December 5, 1958, by T. R. Specht, and assigned to the assignee of the present application, a magnetic core structure of the stacked type is disclosed which possesses several advantages over a conventional magnetic core of the same general type such as disclosed in the Putman patent. The magnetic core disclosed in said copending application distributes the joints between the adjoining edges of the meeting laminations in the layers of said core, into a larger number of planes at each corner of said core and employs laminations which more readily lend themselves to methods of punching or cutting from magnetic strip material which result in a reduced amount of scrap material, particularly in certain types of three-phase magnetic cores. It is, therefore, desirable to provide a magnetic core structure of the stacked type which possesses all of the advantages of the magnetic core disclosed in said copending application and also possesses several additional advantages with respect to the exciting current and the losses associated with the magnetic core of the type described and with respect to the scrap resulting from the punching of the laminations included in such a magnetic core.

It is an object of this invention to provide a new and improved magnetic core structure for electrical induction apparatus, such as transformers.

Another object of this invention is to provide a new and improved magnetic core structure including a plurality of layers of laminations formed from magnetic strip material having a preferred direction of orientation lengthwise of said material.

A further object of this invention is to provide a new and improved magnetic core structure of the stacked type which requires a lower exciting current with a corresponding decrease in associated losses and which results in a reduced amount of scrap from the punching of the laminations included in said core from magnetic strip material.

A still further object of this invention is to provide a magnetic core structure of the stacked type which includes combination butt and lap joints at each corner of the core structure which are distributed into a larger number of planes.

Other objects of the invention will, in part, be obvious and will, in part, appear hereinafter.

For a fuller understanding of the nature and objects of the invention, reference should be had to the following detailed description, taken in connection with the accompanying drawings, in which.

Figures 26, 27:
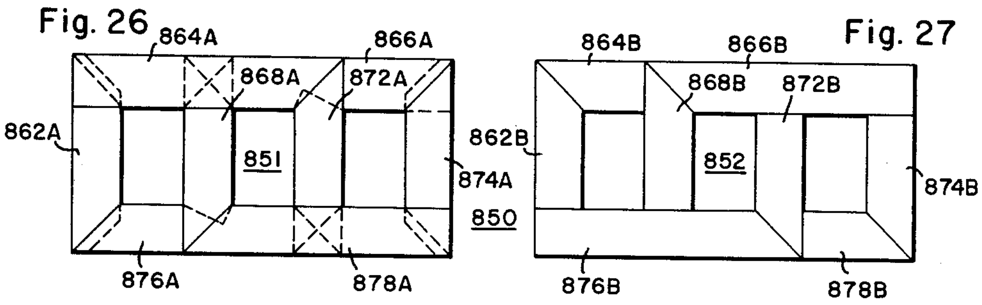
FIGS. 26 through 28 show parts of a magnetic core structure which is a modification of the magnetic core structure shown in FIGS. 20 through 22.
Figures 31, 32:
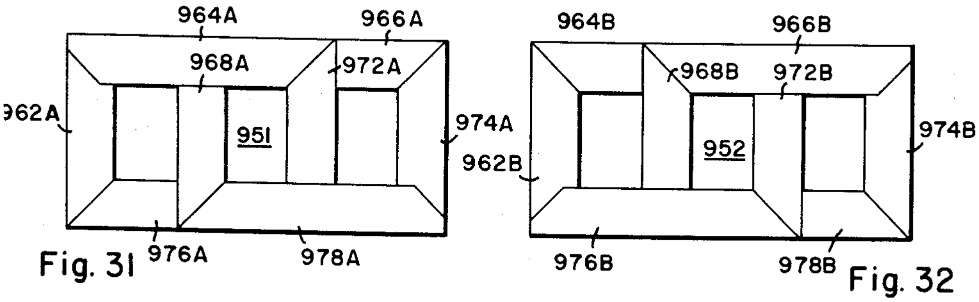
Figure 33:
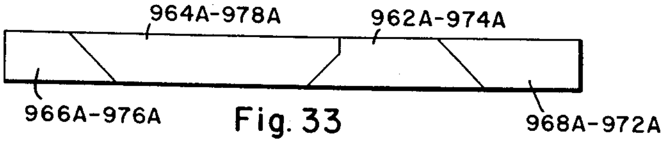

FIGS. 31 and 32 illustrate alternative constructions for the parts of the magnetic core structure shown in FIGS. 26 and 27, respectively; and FIG. 33 shows a method of punching certain of the laminations of the parts of the magnetic core shown in FIGS. 31 and 32.

Figure 1:
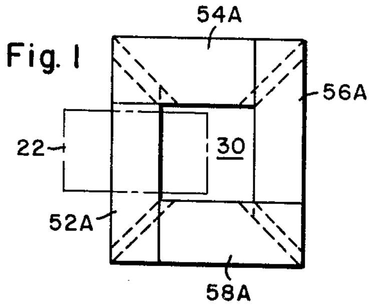
FIGURE 1 is an elevational view of a core and coil assembly illustrating a first embodiment of the invention.

Referring now to the drawing and FIG. 1 in particular, there is shown a core and coil assembly illustrating a first embodiment of the invention. The core and coil assembly includes the magnetic core 30 and the windings 22 which are inductively disposed thereon. In general, the magnetic core 30 includes a plurality of stacked layers of assembled laminations formed from a magnetic strip material having a preferred direction of orientation lengthwise of said material. The plurality of layers includes one or more groups, each of said groups comprising at least three layers of laminations. Each of said layers includes at least four laminations assembled around a substantially rectangular window.

Figure 2:
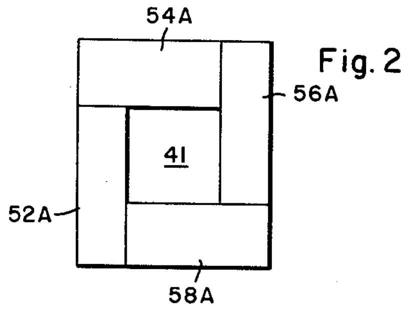
FIGS. 2 through 4 illustrate parts of the magnetic core shown in FIG. 1.
Figure 3:
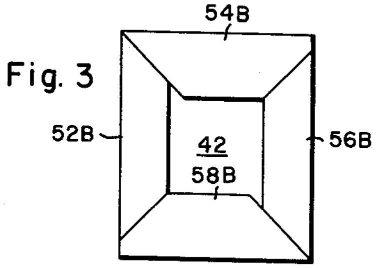
Figure 4:
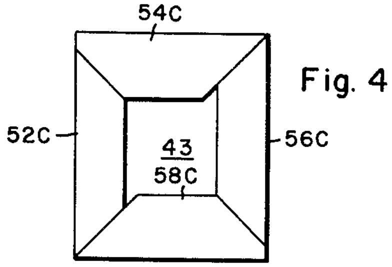

In particular, each of the groups of layers included in the magnetic core 30 include at least three layers, such as the layers 41, 42 and 43 shown in FIGS. 2, 3 and 4, respectively. The layers 41, 42 and 43 each includes first and second leg laminations 52A and 56A, 52B and 56B, and 52C and 56C, respectively, and first and second yoke laminations 54A and 58A, 54B and 58B and 54C and 58C, respectively. Both ends of each of the laminations included in the layer 41 are cut substantially perpendicular with respect to the direction of orientation of the strip material from which said laminations are formed. Both ends of the leg laminations and one end of each of the associated yoke laminations included in each of the layers 42 and 43 are cut at an oblique angle, preferably an angle of substantially 45°, with respect to the direction of orientation of the strip material from which said laminations are formed. The other end of said yoke laminations included in each of the layers 42 and 43 are also cut for a major portion at an oblique angle, preferably an angle of substantially 45°, and for a small portion substantially perpendicular to the direction of orientation of the strip material from which said yoke laminations are formed.

The joints between the adjoining edges of the laminations included in the layer 41 are substantially perpendicular to the direction of orientation of the strip material from which one of the meeting laminations is formed. Two of the joints at two of the diagonally opposite corners of the layer 41 are substantially perpendicular to the direction of orientation of the strip material from which the yoke laminations of said layer are formed and the other two diagonally opposite joints are substantially perpendicular to the direction of orientation of the strip material from which the leg laminations of said layer are formed. The joints between the adjoining edges of the laminations of each of the layers 42 and 43 are disposed at an oblique angle, preferably an angle of substantially 45°, with respect to the direction of orientation of the strip material from which the meeting laminations are formed at each corner of said layers. Two of the joints at two of the diagonally opposite corners of each of the layers 42 and 43 extend along a straight line from a point which is offset from the corner of the window to the nearest outside corner of the over-all core 30. The other two diagonally opposite joints of each of the layers 42 and 43 extend along a straight line from a corner of the window to a point which is offset from the nearest outside corner of over-all core 30.

Referring to FIG. 1, the joints between the adjoining edges of the laminations of the layers 41, 42 and 43 in each group of layers at each corner of the core 30 include one joint which is substantially perpendicular to the direction of orientation of the strip material from which one of the meeting laminations in one of the layers in each group is formed. The other two joints between the adjoining edges of the meeting laminations in the other two layers at each corner are disposed at an oblique angle with respect to the direction of orientation of the strip material from which the meeting laminations in each layer are formed and are also parallel to and offset from each other by a predetermined amount to provide overlap between the joints of the latter two layers. In other words, the joints at each corner of the core 30 in the three layers of each group are divided into at least three planes. The first of said planes as described is substantially perpendicular to the direction of orientation of the strip material from which one of the meeting laminations is formed. The other two planes are at an oblique angle with respect to the direction of orientation of the strip material from which the meeting laminations in each layer are formed as well as being parallel to and offset from each other to provide overlap between the joints located in the latter two planes. The joints between the adjoining or abutting edges of the meeting laminations in each of the layers included in the core 30 are, therefore, overlapped by the laminations in the adjacent layers to provide combination butt and lap joints, the butt joints being distributed into at least three planes. It is to be noted that one end of each of the yoke laminations included in the layers 42 and 43 include a small portion which is substantially perpendicular to the direction of orientation of the strip material from which said laminations are formed in order that the joints between the adjoining edges of yoke laminations and the associated leg laminations in each of said layers at each corner of the core 30 will be offset from each other or displaced from each other as previously described when the layers of said core are assembled and stacked.

Since the ends of the laminations included in the core 30 are cut either substantially perpendicular or at a preferred angle of substantially 45° with respect to the direction of orientation of the strip material from which said laminations are formed, the laminations of the core 30 readily lend themselves to a method of punching or cutting from magnetic strip material which results in only a relatively small amount of scrap. The only scrap which would result would be at one of the ends of each of the yoke laminations in the layers 42 and 43 which are cut for a small portion substantially perpendicular to the direction of orientation of the strip material from which said yoke laminations are formed.

The magnetic core 30 shown in FIG. 1 may be applied, as shown, in a single phase construction of the core form type with associated electrical windings inductively disposed on one of the winding leg members formed from a plurality of leg laminations as shown or on both winding leg members formed by the leg laminations on the opposite sides of the core 30. It is clear that a single phase magnetic core of the shell form type may be formed by providing two adjacent magnetic core sections, each of said core sections being similar to the magnetic core 30 shown in FIG. 1. The width of the center leg member formed by the latter construction would be substantially twice the width of the outer leg members of such a core. It is to be noted that the width of the yoke laminations included in the magnetic core 30 is different than the width of the associated leg laminations. In particular, the width of the yoke laminations is greater than the width of the associated leg laminations since it has been found desirable for improved magnetic performance to vary the relative width of said yoke and leg laminations.

Figure 5:
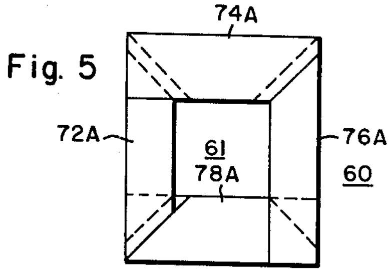
FIGS. 5 through 8 show parts of a magnetic core structure illustrating a second embodiment of the invention.
Figure 6:
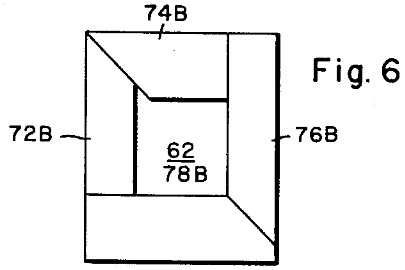
Figure 7:
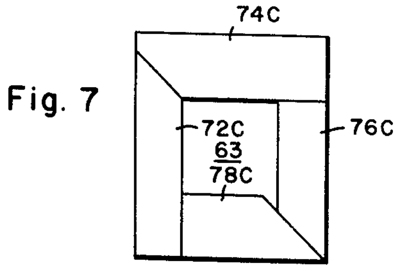
Figure 8:
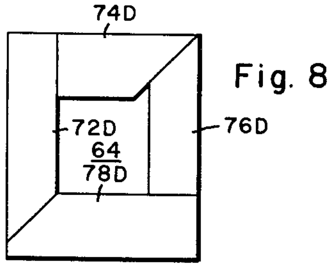

Referring to FIG. 5, there is illustrated a second magnetic core 60 embodying the teachings of the invention. Similarly to the magnetic core 30, the magnetic core 60 includes one or more groups of stacked layers of laminations formed from the same type of magnetic material as the laminations of the core 30, each of said groups including at least four layers of laminations rather than at least three layers as in the core 30. The joints at the corners of the core 60 are also similar to the joints at the corners of the core 30 except that the joints at each corner of the core 60 are distributed or divided into at least four planes rather than into only three planes as in the core 30.

Each of the groups of layers in the core 60 includes at least four layers, such as the layers 61 through 64 shown in FIGS. 5 through 8, respectively. Each of the layers 61 through 64 includes at least four laminations assembled around a substantially rectangular window similar to the core 30. The layers 61 through 64 includes the first leg laminations 72A through 72D, respectively, the second leg laminations 76A through 76D, respectively, the first yoke laminations 74A through 74D, respectively, and the second yoke laminations 78A through 78D, respectively. One end of each of the laminations included in layers 61 through 64 is cut substantially perpendicular to the direction of orientation of the strip material from which said laminations are formed. At least the major portion of the other end of each of said laminations is cut at an oblique angle, preferably at an angle of substantially 45°, with respect to the direction of orientation of the strip material from which said laminations are formed. One end of each of the yoke laminations 74A, 78B, 74C and 78D in the layers 61 through 64, respectively, includes a small portion which is cut substantially perpendicular to the direction of orientation of the strip material from which said yoke laminations are formed.

Two of the joints between the adjoining edges of the meeting laminations at two of the diagonally opposite corners or each of the layers 61 through 64 are substantially perpendicular with respect to the direction of orientation of the strip material from which one of the meeting laminations is formed. The latter two joints in each of said layers are also disposed at substantially a right angle with respect to each other. The other two diagonally opposite joints at the corners of each of said layers between the adjoining edges of the meeting laminations are disposed at an oblique angle, preferably an angle of substantially 45°, with respect to the direction of orientation of the strip material from which the meeting laminations are formed. Similarly to the magnetic core 30, one of the latter two joints in each layer extends along a straight line from a corner of the window of the core 60 to a point which is offset from the nearest outside corner of the core 60 anl the diagonally opposite joint extends along a straight line from the corner of said window to the nearest corner of the over-all core 60.

Considering the joints at each corner of the core 60 between the adjoining edges of the meeting laminations in the four layers of each group, two of said joints in two of the layers at each corner are disposed at an oblique angle with respect to the direction of orientation of the strip material from which laminations of each of said two layers are formed and are parallel to and offset from each other to provide overlap between said joints, similarly to the joints at each corner of the core 30. The other two joints in the other two layers of each group at each corner of the core 60 are disposed substantially perpendicular to the direction of orientation of the strip material from which one of the meeting laminations in each layer is formed and are also substantially perpendicular to each other. The joints between the adjoining or abutting edges of the laminations in each of the layers of the core 60 are therefore overlapped by the laminations in the adjacent layers similarly to the magnetic core 30 to form combination butt and lap joints. In other words, the joints between the adjoining edges of the meeting laminations in the four layers of each group of the core 60 are divided or distributed into four planes which correspond to the four joints just described. In any particular plane therefore only one lamination out of four at each corner of the core 60 is cut or interrupted.

In summary, the joints at each corner of the core 60 are distributed into at least four planes, two of said planes being disposed at an oblique angle with respect to the direction of orientation of the strip material from which the meeting laminations are formed, said first two planes being substantially parallel to and offset from each other and the other two planes substantially perpendicular to the direction of orientation of the strip material from which one of the meeting laminations at each corner are formed, the latter two planes being substantially perpendicular to each other.

Considering the core 30 shown in FIG. 1 and the core 60 shown in FIG. 5, it is important to note that at least two of the joints of the layers in each group at each corner of the latter cores are disposed in two substantially parallel planes at an oblique angle with respect to the direction of orientation or to the longitudinal dimension of the strip material from which the meeting laminations of each layer are formed. The effective joint area of the latter two joints at each corner of said cores in two of the layers in each group is, therefore, greater than the effective joint area of the joints which are disposed substantially perpendicular to the direction of orientation or to the longitudinal dimension of the strip material from which one of the meeting laminations is formed. Therefore, the flux density in the former two joints is less than the flux density in the joints of the latter type in the layers of each group at each corner of said cores to thereby reduce the losses associated with the joints at each corner of said cores. In the case of the magnetic core 60, the joints at each corner of the core 60 in the four layers of each group include two lower flux density joints and two higher flux density joints. The higher losses which might otherwise be associated with the latter construction are offset by a distribution of the joints at each corner of the core 60 into a greater number of planes than are the joints of the core 30.

Figure 9:
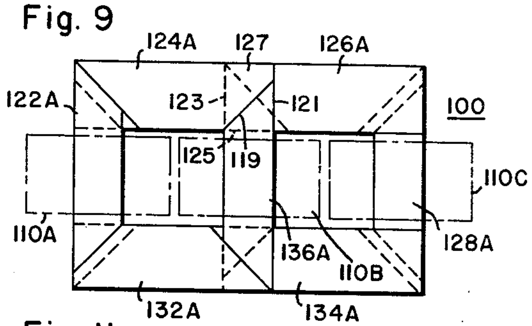
FIG. 9 is an elevational view of a magnetic core structure illustrating a third embodiment of the invention.
Figure 10:
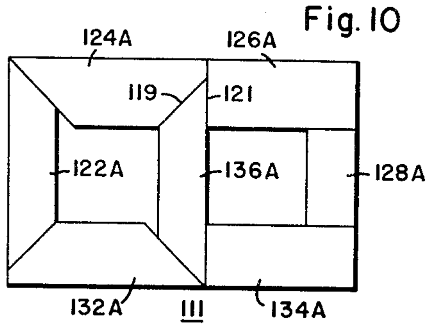
FIGS. 10 through 12 illustrate parts of the magnetic core structure shown in FIG. 9.
Figure 11:
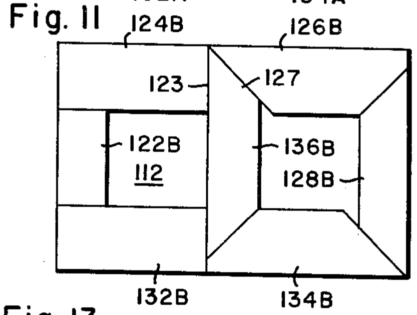

Referring now to FIG. 9, there is illustrated a core and coil assembly including a third magnetic core 100 embodying the teachings of this invention. The core and coil assembly includes a magnetic core 100 on which are inductively disposed three phase windings 110A, 110B and 110C. Similarly to the cores 30 and 60, the magnetic core 100 includes a plurality of stacked layers of assembled laminations formed from magnetic material of the same type as the cores 30 and 60. The plurality of layers comprises one or more groups of layers, each of said groups including at least three layers, such as the layers 111, 112 and 113 shown in FIGS. 10, 11 and 12, respectively. Each of said layers includes at least three leg laminations and connecting yoke laminations connecting the ends of said leg laminations to form a substantially rectangular core having two substantially rectangular windows.

In particular, the layers 111 through 113 include the first outer leg laminations 122A through 122C, respectively, the center leg laminations 136A through 136C, respectively, the second outer leg laminations 128A through 128C, respectively, the first yoke lamination comprising the first yoke lamination portions 124A through 124C, respectively, and the second yoke lamination portions 126A through 126C, respectively, and the second yoke laminations comprising the first yoke lamination portions 132A through 132C, respectively, and the second yoke lamination portions 134A through 134C, respectively. Both ends of the leg laminations 122A and 136A, 136B and 128B, 122C and 128C in the layers 111, 112 and 113, respectively, both ends of the yoke lamination portions 126C and 132C in the layer 113 and one end of each of the yoke lamination portions 124A and 132A, 126B and 134B and 124C and 132C in the layers 111, 112 and 113, respectively, are cut at an oblique angle, preferably an angle of substantially 45°, with respect to the longitudinal dimension or to the direction of orientation of the strip material from which said laminations are formed. The major portion of the other end of the latter yoke lamination portions are cut also at an oblique angle with respect to said direction of orientation and the other end of each said yoke lamination portions also includes a small portion cut substantially perpendicular to said direction of orientation. Both ends of the leg laminations 128A, 122B and 136C of the layers 111, 112 and 113, respectively, and both ends of the yoke lamination portions 126A and 134A and 124B and 132B of the layers 111 and 112, respectively, are cut substantially perpendicular to the direction of orientation of the strip material from which said laminations are formed. It is to be understood that the first and second yoke laminations comprising the first and second yoke lamination portions 124C and 126C and 132C and 134C, respectively, of the layer 113 may be each provided as an integral yoke lamination omitting the joints in said first and second yoke laminations indicated at 133 and 135, respectively.

Two of the adjacent joints at the outside corners of each of the layers 111 and 112 between the adjoining edges of one of the outer leg laminations and the associated yoke lamination portions in each of said layers are disposed substantially perpendicular to the direction of the orientation of the strip material from which one of the meeting laminations is formed. The other two adjacent joints in each of the layers 111 and 112 at the other outside corners of each of said layers is disposed at an oblique angle, preferably an angle of substantially 45°, with respect to the direction of orientation of the strip material from which the meeting laminations are formed. The joints between the adjoining edges of the laminations at each outside corner of the layer 113 are disposed at an oblique angle, preferably an angle of substantially 45°, with respect to the direction of orientation of the strip material from which the meeting laminations are formed. Considering the joints between the adjoining edges of the laminations in the three layers of each group at each outside corner of the core 100, two of said joints in two of said three layers are disposed at an oblique angle with respect to the direction of orientation of the strip material from which the meeting laminations in said two layers are formed and also substantially parallel to and offset from each other to provide overlap between said two joints at each corner of the core 100. The joints between the adjoining or abutting edges of the meeting laminations in the third layer of each group at each corner of the core 100 is substantially perpendicular to the direction of orientation of the strip material from which one of the meeting laminations is formed, which in this case is one of the outer leg laminations. In other words, the joints in the layers of each group at the outside corners of the core 100 are divided or distributed into at least three planes which correspond to the joints in the three layers of each group at each corner of the core 100, as just described, and as previously described in greater detail in connection with the magnetic core 30.

Figure 12:
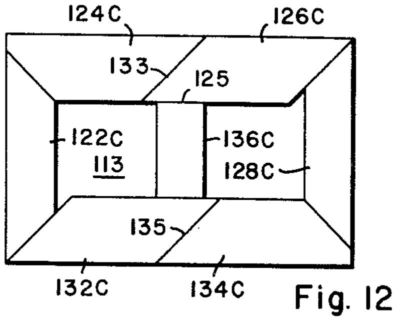

The joints between the adjoining edges of the center leg laminations 136A through 136C and the associated yoke lamination portions in the layers 111 through 113, respectively, are also distributed in a number of different planes. Assuming that the first and second yoke laminations of the layer 113 are each provided as integral laminations rather than including different yoke lamination portions as shown in FIG. 12, the joints between said center leg laminations and the associated yoke laminations of the layers 111 through 113 are divided or distributed into at least five different planes at each end of the core 100 in the three layers of each group. For example, the planes at the upper end of said center leg laminations correspond to the joints between the upper end of said center leg laminations and the associated yoke laminations. Two of said five planes correspond to the joints between the center leg laminations 136A and 136B and the associated yoke lamination portions 126A and 124B, respectively, as indicated at 121 and 123, respectively, and are substantially perpendicular to the direction of orientation of the strip material from which said yoke lamination portions are formed. The latter two planes are also parallel to and offset from each other, the amount of the offset distance being substantially equal to the width of said center leg laminations. Two other planes of said five planes correspond to the joints between the center leg laminations 136A and 136B and the associated yoke lamination portions 124A and 126B, respectively, as indicated at 119 and 127, respectively, and are disposed at an oblique angle, preferably an angle of substantially 45°, with respect to the longitudinal dimensions of the strip material from which the meeting laminations are formed, and are also disposed substantially perpendicular to each other. The fifth plane of said five planes corresponds to the joint between the adjoining edges of the center leg lamination 136C and the yoke lamination portion 126C and is substantially perpendicular to the direction of orientation of the strip material from which said center leg lamination is formed and is also substantially perpendicular to the first-mentioned two planes of said five planes. If the first and second yoke laminations of the layer 113 are divided or split as indicated at 133 or 135 in FIG. 12, the latter joints would be offset from and parallel to the joint between center leg lamination 136A and the yoke lamination portion 124A in the adjoining layer 111, as indicated at 119. The joints between said center leg laminations and the associated yoke laminations of the core 100 at the lower end of each of said center leg laminations are similarly distributed into at least five planes as described in detail for the upper end of said center leg laminations.

The amount of scrap resulting from the punching or cutting of the laminations of the core 100 from magnetic strip material is also reduced to a minimum since the ends of said laminations are cut either substantially perpendicular or at a preferred angle of substantially 45° with respect to the direction of orientation of said strip material. A small amount of scrap results where the ends of certain yoke lamination portions includes a small portion which is cut substantially perpendicular to the direction of orientation of the strip material from which said yoke lamination portions are formed. It is also to be noted that the lamination shapes included in the core 100 are repeated in the layers 111 through 113 and the number of lamination shapes to be handled during assembly and stacking is conveniently held to a minimum while obtaining the advantages of distributed joints at each corner of the core 100. Similarly to the cores 30 and 60, the layers of each group of the core 100 are stacked and assembled in a predetermined sequence or order. It is to be understood that the order of stacking the layers in different groups may be modified in a particular application.

Figure 13:
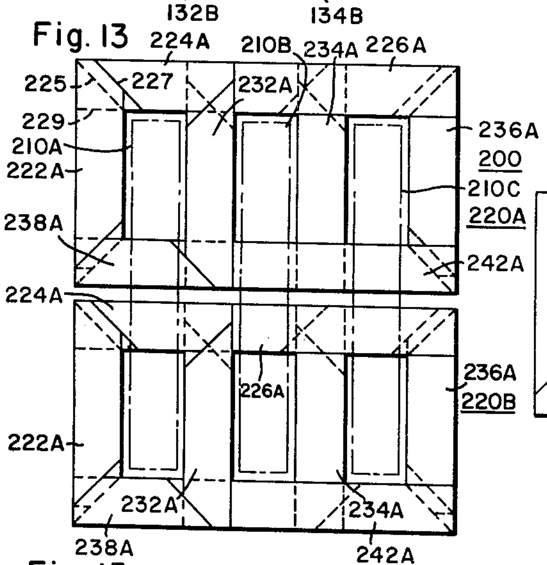
FIG. 13 is a top plan view of a core and coil assembly illustrating a fourth embodiment of the invention.

Referring to FIG. 13, there is shown a core and coil assembly including a fourth magnetic core embodying the teachings of the invention. The core and coil assembly includes a magnetic core 200 comprising first and second magnetic core sections 220A and 220B on which are inductively disposed three phase windings 210A, 210B and 210C. Each of said magnetic core sections includes a plurality of layers of assembled laminations formed from magnetic strip material of the same type as employed in the cores previously discussed. The plurality of layers in each of said magnetic core sections comprise one or more groups, each of said groups including at least three layers of laminations. Each of said layers includes at least four yoke laminations and leg laminations connecting the ends of said yoke laminations to form a substantially rectangular magnetic core section having three substantially rectangular windows. Since the magnetic core sections 220A and 220B are identical and are combined only to form an over-all three phase magnetic core of the shell form type having an effective center leg member whose width is substantially twice the width of the associated outer leg members, only the first magnetic core section 220A will be described in detail.

Figure 14:
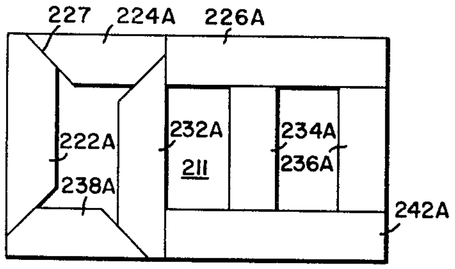
FIGS. 14 through 16 illustrate parts of the magnetic core shown in FIG. 13.
Figure 15:
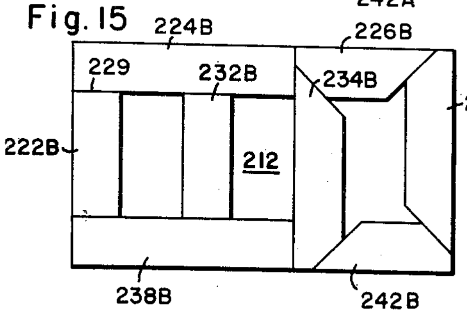
Figure 16:
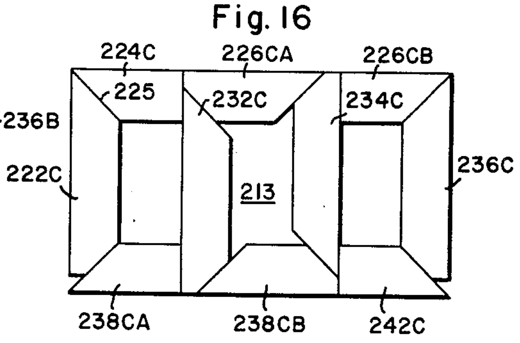

In particular, each of the groups of layers of the first magnetic core section 220A includes at least three layers, such as the layers 211, 212, 213 shown in FIGS. 14 through 16, respectively. The layers 211 through 213 include the first outer yoke laminations 222A through 222C, respectively, the second outer yoke laminations 236A through 236C, respectively, the first intermediate yoke laminations 232A through 232C, respectively, the second intermediate yoke laminations 234A through 234C, respectively, an outer leg lamination including first outer leg lamination portions 224A through 224C, respectively, second outer leg lamination portions 226A and 226B in the layers 211 and 212, respectively, and second and third outer leg lamination portions 226CA and 226CB, respectively, in the layer 213 and center leg laminations including first and second center leg lamination portions 238A and 242A, and 238B and 242B in the layers 211 and 212, respectively, and first, second and third center leg lamination portions 238CA, 238CB and 242C respectively. One end of each of the yoke laminations 222A, 232A, 234B, 236B, 222C, 232C, 234C and 236C and one end of each of the leg lamination portions 224A, 238A, 226B, 242B, 224C, 226CA, 226CB, 238CA, 238CB and 242C are cut at an oblique angle, preferably an angle of substantially 45°, with respect to the direction of orientation of the strip material from which said laminations are formed. The other end of the yoke laminations 222A, 232A, 234B, 236B, 222C, 232C, 234C and 236C and the other end of the leg lamination portions 224A, 238A, 226B, 242B, 226CA and 238CB are cut for a major portion at an oblique angle, preferably an angle of substantially 45°, with respect to the longitudinal dimension of the strip material from which said laminations are formed and for a small portion substantially perpendicular to said longitudinal dimension. The other end of the leg lamination portions 224C, 226CB, 238CA and 242C and both ends of the yoke laminations 234A, 236A, 222B and 232B and both ends of the leg lamination portions 226A, 242A, 224B and 238B are cut substantially perpendicular to the direction of orientation of the strip material from which said laminations are formed.

Considering the joints between the adjoining edges of the laminations in the layers 211 through 213 at each of the outside corners of the magnetic core section 220A, two of the joints between the adjoining edges of the laminations in the layers 211 and 212 at adjacent corners of the core section 220A are disposed at an oblique angle with respect to the direction of orientation of the strip material from which the meeting laminations are formed. The latter joints each extend along a straight line which runs from a point offset from a corner of a window in said core section to a point offset from the nearest outside corner of the core section 220A. The other two adjacent joints at the opposite side of the core section 220A between the adjoining edges of the laminations in each of the layers 211 and 212 are substantially perpendicular to the direction of orientation of one of the meeting laminations, which in this case is the second outer yoke lamination of each of said layers. The joints between the adjoining edges of the laminations in the third layer 213 of each group are each disposed at an oblique angle with respect to the direction of orientation of the strip material from which the meeting laminations are formed. The latter joints between the meeting laminations at the outside corners of the layer 213 extend along a straight line from a corner of one window to the nearest outside corner of the over-all core section 220A. It should be noted that, because of the manner in which the two oblique joints in each of the layers 211 and 212 are offset from the joints at the corresponding outside corners of the layer 213, the two oblique joints at each outside corner of the core section 220A in two of the three layers in each group are parallel to and offset from each other to provide overlap between said oblique joints. Similarly to the joints at the outside corners of the cores 30, 60 and 100, the joints at each outside corner of the core section 220A in the three layers of each group are distributed into at least three planes as indicated at 225, 227 and 229 in FIGS. 13 through 16 at the upper left-hand outside corner of the layers 211 through 213 of the core section 220A. Two of said three planes as just described are at an oblique angle with respect to the direction of orientation of the strip material from which the meeting laminations of each joint are formed. The third of said three planes is substantially perpendicular to the direction of orientation of the strip material from which one of the meeting laminations is formed. The joints in the latter three planes are overlapped by the laminations in the adjacent layers to form combination butt and lap joints, said butt joints being distributed or divided into said three planes.

Considering the joints between the intermediate yoke laminations and the associated leg laminations of each of the layers 211 through 213, the joints between the adjoining edges of said intermediate yoke laminations and the associated leg laminations at each end of the core section 220A are distributed into at least five planes, similarly to the corresponding joints in the magnetic core 100. As described in greater detail in connection with the core 100, two of said five planes into which the joints between the intermediate yoke laminations and the associated leg laminations of the layers 211 through 213 are distributed, are substantially perpendicular to the direction of orientation of the strip material from which said leg laminations are formed. The latter two planes are substantially parallel to each other and displaced or offset from each other by a distance substantially equal to the width of said intermediate yoke laminations. Two other of said five planes are disposed at an oblique angle, preferably an angle of substantially 45°, with respect to the orientation of the magnetic strip material from which the meeting intermediate yoke and leg laminations are formed and are also substantially perpendicular to each other. The fifth of said five planes is substantially perpendicular to the direction of orientation of the strip material from which the intermediate yoke laminations are formed. In summary, the joints between the intermediate yoke laminations and the associated leg laminations of the layers 211 through 213 and each of the groups of layers at each end of the core section 220A are distributed into at least five planes, the joints in said five planes being overlapped by the laminations in the adjacent layers to provide combination butt and lap joints similar to those described for the magnetic core 100.

It should be noted that the width of the yoke laminations and the width of the leg laminations included in the magnetic core 200 are substantially the same but it is to be understood that the width of the yoke laminations may be different in particular applications where, for example, widening of yoke laminations may be desirable for improved magnetic characteristics of the over-all core. It should also be noted that the ends of certain outer yoke laminations included in the core 200 include a small portion cut substantially perpendicular to the direction of the strip material from which said laminations are formed in order to reduce the number of lamination shapes required in the core 200 or to obtain overlapping between certain oblique joints in said core.

Figures 17, 18, 19, 20, 21, 22, 23, 24, 25:
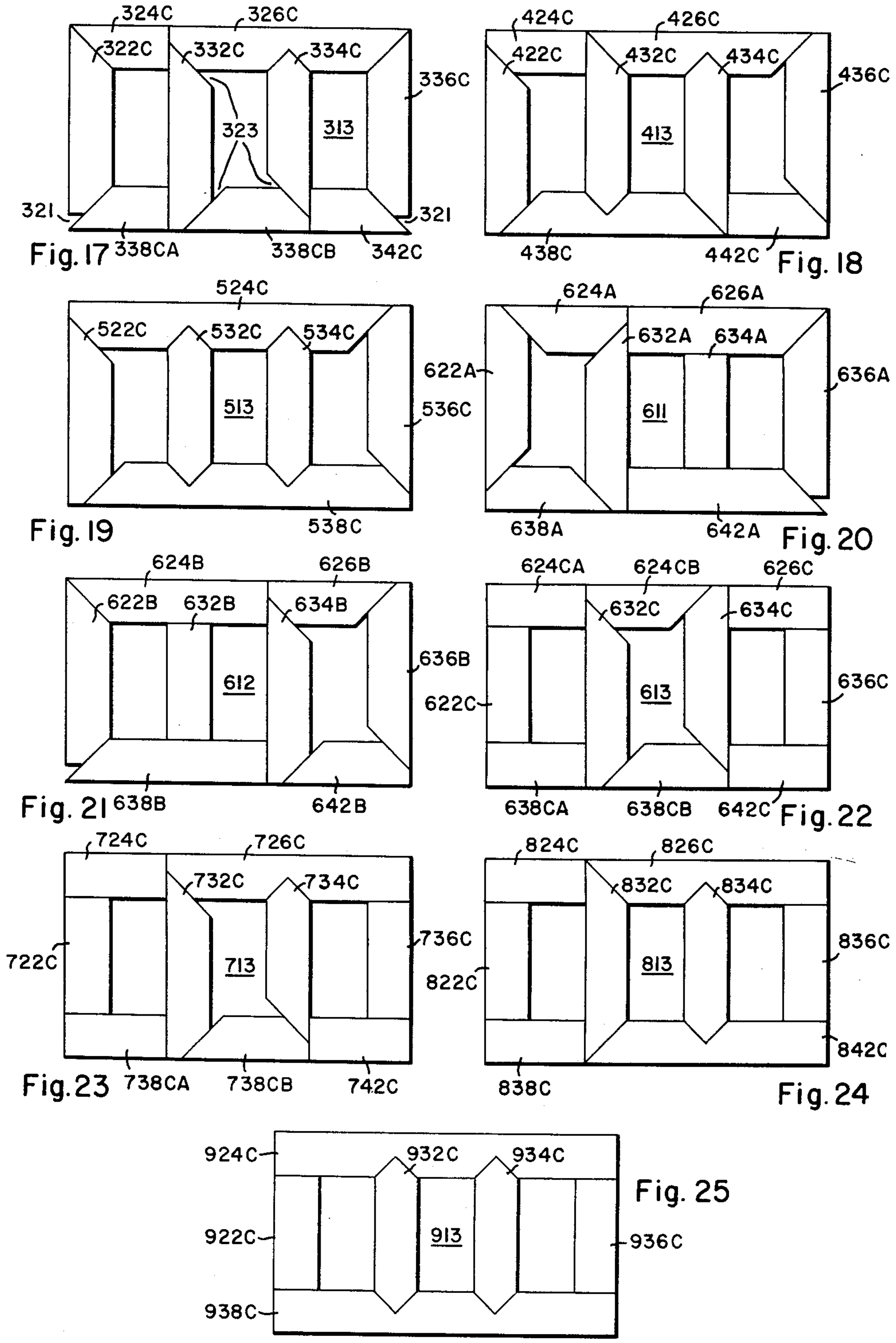
FIGS. 17 through 19 illustrate alternative constructions for the part of the magnetic core shown in FIG. 16.
FIGS. 20 through 22 illustrate parts of a magnetic core structure illustrating a fifth embodiment of the invention.
FIGS. 23 through 25 show alternative constructions of the part of the magnetic core shown in FIG. 22.

Referring to FIGS. 17 through 19, there are illustrated alternative constructions for the layer 213 shown in FIG. 16. The layers 313, 413, and 513 may each be substituted for the layer 213 in the magnetic core sections 220A and 220B of the magnetic core 200 shown in FIG. 13. In general, the latter layers are similar to the layer 213 except that the number of leg lamination portions included in the layers 313, 413 and 513 is less than the number of corresponding leg laminations included in the layer 213. The construction shown for the layers 313, 413 and 513 has certain advantages for more convenient assembly of a magnetic core, such as the magnetic core 200 with associated electrical windings in a three-phase core and coil assembly employing shell form type construction.

In particular, the layer 313 is similar to the layer 213 except that the second leg lamination portion 326C of the layer 313 is substituted for the leg lamination portions 226CA and 226CB of the layer 213 and the second intermediate yoke lamination 334C has a generally V-shaped upper end rather than being partially cut at an oblique angle and partially perpendicular to the direction of orientation of the strip material as is the the second intermediate yoke lamination 234C of the core 200. The balance of the laminations in the layer 313 are identical to the corresponding laminations of the layer 213 and the reference numerals of the corresponding laminations in the layer 313 are similar to the reference numerals of the corresponding laminations in the layer 213. The second leg lamination portion 326C includes a generally V-shaped recess to accommodate the upper end of the second intermediate yoke lamination 334C, the sides of said recess and the upper end of said yoke lamination being both cut at an oblique angle, preferably an angle of substantially 45°, with respect to the direction of orientation of the strip material from which said laminations are formed, and said sides being substantially perpendicular to each other. The joint between the adjoining edges of one side of the yoke lamination 334C and the leg lamination portion 326C is substantially parallel to and offset from the joint between the adjoining edges of the yoke lamination 234B and the associated leg lamination 226B in the layer 212 shown in FIG. 15 and is also overlapped by the leg lamination portion 226A in the layer 211 shown in FIG. 14.

In a magnetic core section including one or more groups, each group including at least three layers such as the layers 211, 212 and 313, the joints between the second intermediate yoke laminations and the associated leg laminations of said layers at each end of said core section would be distributed into at least five planes similarly to the corresponding joints in the core sections of the core 200. Two of said five planes would be substantially parallel to each other and at an oblique angle with respect to the direction of orientation of the strip material from which the leg laminations of said layers are formed. A third plane of said five planes would be at an oblique angle with respect to the direction of orientation of the strip material from which the meeting laminations are formed and also perpendicular to said first two planes of said five planes. The last two planes of said five planes would be substantially perpendicular to the direction of orientation of the strip material from which either said leg laminations or said yoke laminations of said layers are formed and also substantially perpendicular to each other. As described, the joints in said five planes would be overlapped by the laminations in the adjacent layers to provide combination butt and lap joints similar to those previously described for the core 200. The joints between the adjoining edges of the outer yoke and first intermediate laminations of the layer 313 are identical to those of the layer 213 previously described.

Referring to FIG. 18, the layer 413 is similar to the layer 213 except that one end of each of the first and second intermediate yoke laminations 432C and 434C, respectively, is generally V-shaped similar to the intermediate yoke lamination 334C of the layer 313. In addition, the other end of each of said intermediate yoke laminations of the layer 14 is cut at an oblique angle, preferably an angle of substantially 45°, with respect to the direction of orientation of the strip material from which said yoke laminations are formed. Similarly to the layer 213, the layer 413 includes first and second outer yoke laminations 422C and 436C, respectively, an outer leg lamination comprising first and second outer leg lamination portions 424C and 426C, respectively, and a center leg lamination comprising first and second center leg lamination portions 438C and 442C, respectively. The first and second outer yoke laminations of the layer 413 have an identical shape to the corresponding laminations of the layer 213 and the second outer yoke lamination 436C is reversed during assembly compared to the corresponding second outer yoke lamination 236C of the layer 213. The leg lamination portions 424C and 442C differ from the corresponding laminations in the layer 213 in that each of the former laminations is cut for a major portion at one end at an oblique angle, preferably an angle of substantially 45° and for a small portion substantially perpendicular with respect to the direction of orientation of the strip material from which said laminations are formed rather than being cut entirely at one end at an oblique angle as are the corresponding laminations in the layer 213. The leg lamination portions 426C and 438C of the layer 413 each replace two corresponding leg lamination portions in the layer 213 and the ends of said leg lamination portions in the layer 413 are each cut at an oblique angle, preferably an angle of substantially 45°, with respect to the direction of orientation of the strip material from which said laminations are formed and include a generally V-shaped recess to accommodate the adjoining edges of the ends of the associated intermediate yoke laminations 434C and 432C, respectively.

In a magnetic core section including one or more groups, each group including at least three layers such as the layers 211, 212 and 413, the joints at each of the outside corners of said core in the three layers of each group are distributed into at least three planes, two of said planes being at an oblique angle with respect to the direction of orientation of the strip material from which the meeting laminations are formed and one of said three planes being substantially perpendicular to the direction of orientation of the strip material from which one of the meeting laminations is formed. The two planes at the oblique angles are parallel to and offset from each other to provide overlap between the joints in said two planes at each corner of an over-all core section. The joints in the latter two planes each extend along a straight line from a point offset from the corner of one of the windows to a point offset from the nearest outside corner of the over-all core section. The joints between the adjoining edges of the upper end of the first intermediate yoke laminations and the lower end of the second intermediate yoke laminations of said layers are distributed into at least five planes, two of said planes being at an oblique angle with respect to the direction of orientation of the strip material from which the meeting laminations are formed, as well as being parallel to and offset from each other to provide overlap between the joints in said two planes. A third plane of said five planes is also at an oblique angle with respect to said direction of orientation and substantially perpendicular to said first two planes. The last two planes of said five planes are substantially perpendicular to the direction of orientation of the strip material from which the leg laminations in each of said layers are formed and parallel to and offset from each other by a distance substantially equal to the width of said intermediate yoke laminations. The joints at the other ends of the first and second intermediate yoke laminations 432C and 434C are also distributed into at least five planes as described in greater detail in connection with the layer 313 and the upper end of the second intermediate yoke lamination thereof.

Referring to FIG. 19, there is illustrated another layer 513 which may be substituted for the layer 213 shown in FIG. 16 in a magnetic core construction similar to the magnetic core 200. In general, both ends of each of the intermediate yoke laminations of the layer 513 have been modified to include generally V-shaped ends which permits a further reduction in the number of associated leg lamination portions in the layer 513.

In particular, the layer 513 includes first and second outer yoke laminations 522C and 536C, respectively, first and second intermediate yoke laminations 532C and 534C, respectively, and first and second leg laminations 524C and 538C, respectively. The layer 513 is similar to the layer 413 except that both ends of the intermediate yoke laminations 532C and 534C have been modified to include generally V-shaped ends, rather than having only one end V-shaped as do the intermediate yoke laminations of the layer 413 and the second intermediate yoke lamination 334C of the layer 313. In addition, the leg laminations 524C and 538C each replace two corresponding leg lamination portions such as were provided at each end of the layers 413. The first and second leg laminations 524C and 538C each includes two generally V-shaped recesses to accommodate the ends of the associated intermediate yoke laminations 532C and 534C, at least the major portion of both ends of each of said leg laminations being cut at an oblique angle with respect to the direction of orientation of the strip material from which said leg laminations are formed and one end of said leg laminations also including a small portion cut substantially perpendicular to said direction of orientation.

The joints at each of the outside corners of a magnetic core including one or more groups of layers, each group including at least three layers such as the layers 211, 212 and 513, would be identical to the corresponding joints at each of the outside corners of the magnetic core in which the layer 413 was substituted for the layer 213, as previously discussed. The joints at each end of said core between the adjoining edges of said intermediate yoke laminations and the associated leg laminations would be distributed into at least five planes as previously discussed in connection with the layers 313 and 413 in which at least one end of one intermediate yoke lamination was generally V-shaped. It is to be noted that the V-shaped ends of the intermediate yoke laminations of the layers 413 and 513 are identical in construction as previously discussed in detail for the second intermediate lamination 334C of the layer 313.

In summary, the layers 313, 413, 513 each permit a reduction in the number of leg lamination portions which must be handled during assembly and stacking of a magnetic core including said layers compared to the layer 213 of the core 200. The layers 413 and 513 have the additional advantage over the layer 313 that the cutout portions as indicated at 321 and 323 in the layer 313 as shown in FIG. 17 are substantially eliminated and the flux density in the adjacent joints between the intermediate yoke laminations and the associated leg laminations of the layers 413 and 513 is reduced compared to the flux density in the corresponding joints in the layer 213.

Referring to FIGS. 20 through 22, there are illustrated three layers of laminations 611, 612 and 613, respectively, which may be substituted for the layers 211 through 213, respectively, in each of the magnetic core sections 220A and 220B of the magnetic cores 200 shown in FIG. 13. A magnetic core including one or more groups of layers, each group including at least three layers, such as the layers 611 through 613, would otherwise be similar to the magnetic core 200.

In particular, the layers 611 through 613 include first and second outer yoke laminations 622A through 622C and 636A through 636C, respectively, first and second intermediate yoke laminations 632A through 632C and 634A through 634C and the outer leg laminations comprising the outer leg lamination portions 624A and 626A, 624B and 626B and 624CA, 624CB and 626C, respectively, and the center leg laminations comprising the center leg lamination portions 638A and 642A, 638B and 642B and 638CA, and 638CB and 642C, respectively. The laminations of the layers 611 through 613 are similar to the laminations of the layers 211 through 213, respectively, except that the laminations of the former layers have been modified so that the joints between the adjoining edges of the laminations at the outside corners at the right side and at the left side of the layers 611 and 612, respectively, are at an oblique angle, rather than being at substantially a right angle, with respect to the direction of orientation of the strip material from which the meeting laminations are formed. In addition, the laminations of the layers 613 have been modified compared to those of the layer 213 so that the joints between the adjoining edges of said laminations at each of the outside corners of the layer 613 are substantially perpendicular with respect to the direction of orientation of the strip material from which one of the meeting laminations is formed. In particular, at least a major portion of one end of the leg lamination portions 626A and 642A and 624B and 638B and one end of the outer yoke laminations 626A and 636B in the layers 611 and 612, respectively, is cut at an oblique angle, preferably an angle of substantially 45°, with respect to the direction of orientation of the strip material from which said laminations are formed. The other end of the outer yoke laminations 626A and 636B also includes a major portion cut at an oblique angle, preferably an angle of substantially 45°, with respect to said direction of orientation and a small portion cut substantially perpendicular to said direction of orientation. In addition, each of the leg lamination portions 626CA, 626C, 638CA and 642C and each of the outer yoke laminations 622C and 636C are cut at both ends to be substantially perpendicular to the direction of orientation of the strip material from which said laminations are formed rather than having one end cut at an oblique angle for at least a major portion with respect to said direction of orientation as are the corresponding laminations of the layer 213 in the core 200.

The joints between the adjoining edges of the outer yoke laminations and the associated leg laminations at each of the corners of the layers 611 and 612 are at an oblique angle with respect to the direction of orientation of the strip material from which the meeting laminations are formed. Similarly to the oblique joints in the layers of each group of layers of the core sections of the core 200 at each outside corner, the joints at the corresponding corners of the layers 611 and 612 are substantially parallel to each other and offset from each other to provide overlap between said joints. One of said two oblique joints at the corresponding corners of the layers 611 and 612 extends along a straight line from one corner of a window to the nearest outside corner of the over-all core section including said layers and the other joint extends along the straight line from a point offset from one corner of a window to a point offset from the nearest outside corner of said over-all core section. The joints between the adjoining edges of the meeting laminations at the outside corner of the layer 613 are substantially perpendicular to the direction of orientation of the strip material from which one of the meeting laminations is formed, which in this case is the material from which the outer yoke laminations are formed. In other words, the joints at each outside corner of a core section including the layers 611 through 613 in each group of layers are divided or distributed into at least three planes which correspond to the joints of the layers 611 through 613 just described. Two of said three planes are at an oblique angle with respect to the direction of orientation of the strip material from which the meeting laminations are formed and the third plane is substantially perpendicular to the direction of orientation of the strip material from which the outer yoke laminations are formed. The joints between the intermediate yoke laminations and the associated leg laminations of the layers 611 through 613 are identical to the corresponding joints in the layers 211 through 213, respectively, as previously described in detail, and lie in at least five planes similarly to the corresponding joints of the layers 211 through 213.

Referring to FIGS. 23 through 25, there are illustrated three alternative layers 713, 813 and 913, respectively, which may be substituted for the layer 613 shown in FIG. 22. In general, the layers 713 through 913 each have the advantage over the layer 613 in that the number of leg lamination portions in the alternative layers is reduced compared to the number of the corresponding lamination portions included in the layer 613, which must be handled during the assembly and stacking of a magnetic core including one of the alternative layers.

Referring to FIG. 23, the layer 713 is similar to the layer 613 except that the leg lamination portion 726C is substituted for the leg lamination portions 624CB and 626C included in the layer 613 and the upper end of the intermediate yoke lamination 734C is generally V-shaped rather than being cut at an oblique angle for a major portion and substantially perpendicular for a small portion with respect to the direction of orientation as is the intermediate yoke lamination 634C of the layer 613. The balance of the laminations in the layer 713 are identical to the corresponding laminations of the layers 613.

In a magnetic core including the layers 611, 612 and 713 in one or more groups, the joints between tthe adjoining edges of the laminations in each of said layers are the same as previously described for the layers 611 through 613, except for the joints between the adjoining edges of the second intermediate yoke laminations of the layers 611, 612 and 713 and the associated leg laminations. The joints between the second intermediate yoke laminations and the associated leg laminations of the layers of the modified core including the layer 713 in each group are distributed into at least five planes as previously discussed for a magnetic core including one or more groups of layers, each group including at least three layers such as the layers 211, 212 and 313.

Referring to FIG. 24, the layer 813 is similar to the layer 613 except that the leg lamination portions 826C and 842C each replace two corresponding leg lamination portions which are included in the layer 613. In addition, both ends of the second intermediate yoke lamination 834C of the layer 13 have been modified to be generally V-shaped similarly to the upper end of the second intermediate yoke lamination 734C of the layer 713 and both ends of the first intermediate yoke lamination 832C of the layer 813 have been modified to be cut at an oblique angle with respect to the direction of orientation of the strip material from which said first intermediate yoke lamination 432C is formed, similarly to the upper end of the first intermediate yoke lamination 432C shown in FIG. 18. The second leg lamination portions 826C and 842C each includes a generally V-shaped recess to accommodate one of the ends of the second intermediate yoke lamination 834C and are each cut at an oblique angle at one end to match the ends of the first intermediate yoke lamination 832C.

In a magnetic core in which one or more groups of layers are provided, each group including at least three layers such as the layers 611, 612 and 813, the joints between the adjoining edges of the laminations at each outside corner of said core in each group are divided into at least three planes and are substantially identical to the joints at each corner of a core including the layer 613 rather than the layer 813 as previously described in detail. The joints between the adjoining edges of the intermediate yoke laminations and the associated leg laminations in a magnetic core including the layer 813 at each end of said core are also divided into at least five planes as previously discussed in connection with a magnetic core including the layers 211, 212 and 413.

Referring to FIG. 25, the layer 913 is similar to the layer 613 except that the outer leg lamination 924C and the center leg lamination 938C of the layer 913 each replaces three leg lamination portions which are provided in the layer 613. The first and second intermediate yoke laminations 932C and 934C of the layer 913 are each identical to the second intermediate yoke lamination 834C of the layer 813 and the leg laminations 924C and 938C each includes two generally V-shaped recesses to accommodate the ends of the associated intermediate yoke laminations 932C and 934C of the layer 913.

The joints between the adjoining edges of the laminations at the outside corner of a core section comprising one or more groups each including the layer 913, rather than the layer 613, are distributed into three planes and are identical to the joints previously described at the outside corner of a core including the layers 611 through 613. The joints between the adjoining edges of the intermediate yoke laminations and the associated leg laminations of a core section comprising one or more groups each including the layer 913, at each end of said core section are distributed into at least five planes as previously discussed in connection with the layer 513 in a magnetic core section including the layers 211, 212 and 513 in one or more groups.

Figure 28:
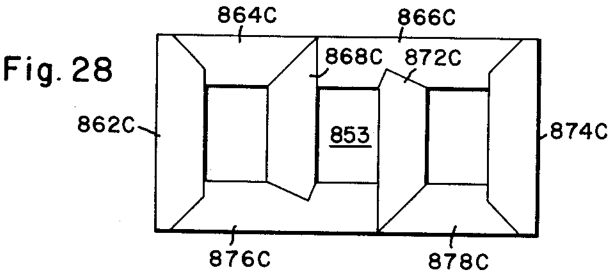

Referring to FIGS. 26 through 28, there are illustarted three layers 851, 852 and 853 which may be substituted for the layers 211 through 213 in one or more groups in each of the magnetic core sections 220A and 220B of the magnetic core 200. A magnetic core including one or more groups, each including at least three layers, such as the layers 851 to 853, would otherwise be similar to the magnetic core 200 shown in FIG. 13.

In particular, the layers 851 through 853 include first and second outer yoke laminations 862A through 862C, respectively, and 874A through 874C, respectively, first and second intermediate yoke laminations 868A through 868C, respectively, and 872A through 872C, respectively, the outer leg laminations comprising first and second outer leg lamination portions 864A through 864C, respectively, and 866A through 866C, respectively, and a center leg lamination comprising first and second center leg lamination portions 876A through 876C and 878A through 878C, respectively. One end of each of the laminations in the layers 851 and 852 is cut at an oblique angle, preferably an angle of substantially 45°, and the other end of each of said laminations is cut substantially perpendicular to the direction of orientation of the strip material from which said laminations are formed. At least a major portion of both ends of the first and second outer yoke laminations 862C and 874C, respectively, one end of each of the leg lamination portions 864C, 866C, 876C and 878C and one end of each of the intermediate yoke laminations 868C and 872C of the layer 853 are cut at an oblique angle, preferably an angle of substantially 45°, with respect to the direction of orientation of the strip material from which said laminations are formed. The other end of the intermediate yoke laminations 868C and 872C are cut for a major portion at an oblique angle, preferably an angle of substantially 67½°, with respect to the direction of orientation of the strip material from which said yoke laminations are formed and includes a small portion which is also cut at an oblique angle with respect to said direction of orientation and is preferably disposed at substantially a right angle with respect to the major portion at said ends of said laminations. The latter small portions at the respective ends of said intermediate yoke laminations of the layer 853 are preferably disposed at an angle of substantially 22½° with respect to the adjacent side of each of said yoke laminations if extended.

Referring to FIG. 26, the joints between the adjoining edges of the laminations at each of the outside corners of a magnetic core including the layers 851 through 853 in one or more groups are distributed into at least three planes, two of said planes being at an oblique angle with respect to the direction of orientation of the strip material from which the meeting laminations are formed, as well as being parallel to and offset from each other to provide overlap between the joints of said planes and the third plane of said three planes being substantially perpendicular to the direction of orientation of the strip material from which only one of the meeting laminations is formed which in this case is the outer yoke laminations of said layers. Similar to the core sections of the magnetic core 200, the joints between the adjoining edges of the intermediate yoke laminations and the associated leg laminations of the layers 851 through 853 at each end of a magnetic core 850, including said layers, would be divided into at least five planes. For example, the joints between the upper end of the first intermediate yoke laminations and the associated leg laminations in said layers would be distributed into at least five planes, two of said five planes being disposed at an oblique angle with respect to the direction of orientation of the strip material from which the meeting laminations are formed and which are perpendicular to each other, two other of said five planes being planes substantially perpendicular to the direction of orientation of the strip material from which the leg laminations of said layers are formed, the latter two planes being parallel to and offset from each other by a distance substantially equal to the width of said intermediate yoke laminations and a fifth plane of said five planes being substantially perpendicular to the direction of orientation of the strip material from which the intermediate yoke laminations of said layers are formed. The joints between the upper end of the second intermediate yoke laminations and the adjoining edges of the associated leg laminations of said layers are also distributed into at least five planes, two of said five planes being substantially perpendicular to the direction of orientation of the strip material from which the leg laminations and the intermediate yoke laminations, respectively, of said layers are formed, said first two planes being perpendicular to each other, two other of said five planes being disposed at an oblique angle with respect to the direction of orientation of the strip material from which the meeting laminations are formed, said two other planes being perpendicular to each other and a fifth plane of said five planes being at an oblique angle with respect to the direction of orientation of the strip material from which the meeting laminations are formed, but at a different oblique angle from said first-mentioned oblique angle so that the portion of the joints in the latter plane overlap a portion of the joints in one of the two other oblique planes.

Figure 29:
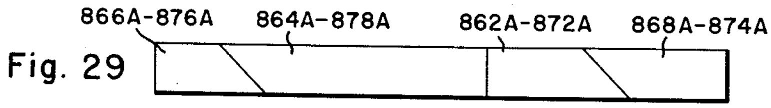
FIGS. 29 and 30 illustrate methods of punching certain of the laminations required for parts of the magnetic core shown in FIGS. 26 through 28.
Figure 30:
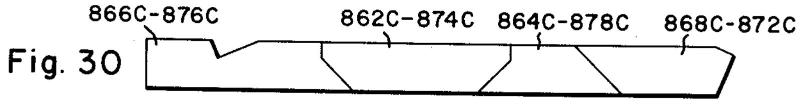

Referring to FIGS. 29 and 30, the method of punching or cutting the laminations required in the layers 851 and 852 from magnetic strip material is substantially scrapless as shown in FIG. 29, in which the reference numbers of the corresponding laminations are indicated. The method of punching laminations required in the layer 853 is shown in FIG. 30 and the amount of scrap resulting from the latter method is also held to a minimum except for the recesses in the leg lamination portions 866C and 876C and the generally V-shaped ends of the intermediate yoke laminations 868C and 872C.

Referring to FIGS. 31 and 32, there are illustrated two alternative layers 951 and 952 which may be substituted for the layers 851 and 852 in the core 850 shown in FIG. 26. In general, the layers 951 and 952 differ from the layers 851 and 852, respectively, in that the joints at two of the diagonally opposite corners of the layers 951 and 952 are disposed at an oblique angle with respect to the direction of orientation of the strip material from which the meeting laminations are formed rather than being substantially perpendicular to the direction of orientation of the strip material from which one of the meeting laminations is formed as provided in the layers 851 and 852.

In particular, at least a major portion of the meeting laminations 964A and 978A and 966B and 976B in the layers 951 and 952, respectively, and at least a major portion of one end of the outer yoke laminations 962A and 974A and 962B and 974B and in the layers 951 and 952, respectively, are cut at an oblique angle, preferably an angle of 45°, with respect to the direction of orientation of the strip material from which said laminations are formed and the same end of each of said laminations includes a small portion cut substantially perpendicular to said direction of orientation. It should be noted that the joints between the adjoining edges of the outer yoke laminations and the associated leg laminations at two of the diagonally opposite corners of each of the layers 951 and 952 are disposed at an oblique angle with respect to the direction of orientation of the strip material from which the meeting laminations are formed and extend along a straight line from a corner of one of the windows of each of said layers to the nearest outside corner of each of said layers. The other two diagonally opposite joints at the outside corners of each of the layers 951 and 952 are also disposed at an oblique angle with respect to said direction of orientation, but extend along a straight line from a point displaced from a corner of one of the windows of each of said layers to a point offset from the nearest outside corner of each of said layers so that the latter joints are parallel to and offset from the oblique joints at the corresponding corners of each of said layers.

It should be noted that the joints between the adjoining edges of the laminations at each of the outside corners of the layer 853 in a magnetic core section including the layers 951, 952 and 853 in one or more groups would also be parallel to the oblique joints at the corresponding corners of the layers 951 and 952 which extend from a corner of one window to the nearest outside corner of said layers and offset from said latter joints on opposite sides of said latter joints at each outside corner of said core section to provide overlap between the joints in the three layers of each group at each outside corner of said core section. The joints between the intermediate yoke laminations and the associated leg laminations of the magnetic core section including the layers 951, 952 and 853 in one or more groups rather than the layers 851, 852 and 853, respectively, would be distributed into at least five planes and be identical to the corresponding joints as previously described in detail for the layers 851, 852 and 853. The joints in each group of layers at each outside corner of a magnetic core including the layers 951, 952 and 853 would be divided or distributed into three substantially parallel planes which are offset from each other as previously described for the core 850. One of said three planes at each corner would extend from a corner of one of the windows of said core to the nearest outside corner of the overall core and the other two planes would be parallel to and offset from said first plane by a substantially equal amount on opposite sides of said first plane.

Referring to FIG. 33, the method of punching or cutting the laminations from magnetic strip material which are required for the layers 951 and 952 is essentially scrapless as shown in FIG. 33, with the corresponding reference numbers of the laminations required for the layers 951 and 952 indicated.

In summary, in a magnetic core construction as disclosed, including one or more groups of layers of assembled laminations, the joints between the adjoining edges of the laminations at each outside corner of said core are divided or distributed into at least three planes in the layers of each group, two of said planes being at an oblique angle with respect to the direction of orientation of the strip material from which the meeting laminations are formed. In the combination butt and lap joints provided at each outside corner of a core as disclosed, the flux density is reduced because of the increased number of oblique joints provided at each outside corner of said core. The principle of the lower density oblique joints in an increased proportion in the layers of each group is also extended to the joints between the intermediate laminations and the associated laminations in the three-phase magnetic core constructions disclosed. As indicated for the various magnetic core disclosed, the laminations required in each core readily lend themselves to methods of punching or cutting from magnetic strip material which are either essentially scrapless or which reduce the amount of scrap to a minimum.

It is to be understood that the layers included in the groups of layers of the various cores disclosed are preferably stacked in a predetermined repeating sequence but that the order of stacking said layers may be modified in a particular application in different groups of the same core. It is also to be understood that more than one layer of the same configuration or having the same laminations, up to a preferred maximum of three, may be stacked simultaneously for convenience during assembly and stacking of a magnetic core as disclosed. Although it is contemplated that the magnetic strip material, from which the laminations of a core as disclosed are formed, has at least one preferred direction of orientation substantially parallel to the longitudinal dimension of said material, such as cold rolled silicon steel, it is to be understood that the magnetic material may have two preferred directions of orientation. One of the latter directions of orientation may be substantially parallel to the longitudinal dimension of the strip material and the other preferred direction of orientation substantially perpendicular to said first preferred direction of orientation. Magnetic strip materials having two preferred directions of orientation include aluminum-iron alloys, silicon-iron alloys and nickel-iron alloys, such as the aluminum-iron alloy described in copending application Serial No. 601,482, filed by Pavlovich et al., and assigned to the assignee of the present application.

A magnetic core embodying the teachings of the invention possesses all of the advantages of the magnetic core structure disclosed in copending application Serial No. 778,369, previously mentioned, and also has several additional advantages. A first additional advantage is that, while the joints of a magnetic core as disclosed are distributed into at least three planes adjacent to the outside corner of a core as disclosed and the joints between any intermediate laminations and associated connecting laminations are similarly distributed into a plurality of planes, a greater proportion of the joints in the different planes as disclosed is disposed at an oblique angle with respect to the direction of orientation of the magnetic strip material, from which the laminations in each core are formed and said joints have a lower associated flux density than joints disposed substantially perpendicular to said direction of orientation. The latter construction, therefore, reduces the effective flux density in the over-all joints of a core as disclosed. The reduced flux density in a magnetic core as disclosed results in a lower exciting current and lower losses associated with such a core. A second additional advantage of a magnetic core as disclosed is that in certain of the core constructions embodying the teachings of the invention, the number of lamination shapes may be reduced while said laminations still retain the advantage of lending themselves to methods of punching or cutting from magnetic strip material which are essentially scrapless or which keep the amount of scrap to a minimum.

Since numerous changes may be made in the above described apparatus and different embodiments of the invention may be made without departing from the spirit or scope thereof, it is intended that all the matter contained in the foregoing description or shown in the accompanying drawing shall be interpreted as illustrative and not in a limiting sense.

We claim as our invention:

1. In a magnetic core structure, the combination comprising a plurality of stacked layers of laminations formed from magnetic strip material having a preferred direction of orientation lengthwise of said material, each layer including at least four laminations assembled around a substantially rectangular window, said plurality of layers being divided into one or more groups each including at least three layers, the joints between the adjoining edges of the laminations in two of the three layers in each group being at an oblique angle with respect to the direction of orientation of the material from which the meeting laminations are formed, said joints in said two layers at each outside corner of said core structure being parallel to each other and offset from each other to provide overlap between said joints, the joints between the adjoining edges of the laminations in the third layer of each group being substantially perpendicular to the direction of orientation of the strip material from which one of the meeting laminations is formed, the joints between the laminations of each layer of said core structure being overlapped by the laminations in the adjacent layers.

2. In a magnetic core structure, the combination comprising a plurality of stacked layers of laminations formed from magnetic strip material having a first preferred direction of orientation lengthwise of said material and a second preferred direction substantially perpendicular to said first preferred direction, each layer including at least four laminations assembled around a substantially rectangular window, said plurality of layers being divided into one or more groups each including at least three layers, the joints between the adjoining edges of the laminations in two of the layers in each group being at an oblique angle with respect to the first direction of orientation of the material from which the meeting laminations are formed, said joints in said two layers at each outside corner of said core structure being parallel to each other and offset from each other to provide overlap between said joints, the joints between the adjoining edges of the laminations in the third layer of each group being substantially perpendicular to the first direction of orientation and substantially parallel to the second direction of orientation of the strip material from which one of the meeting laminations is formed, the width of the laminations on two opposite sides of each layer being larger than the width of the laminations on the other two opposite sides of said layers, the joints between the laminations of each layer of said core structure being overlapped by the laminations in the adjacent layers.

3. In an electrical apparatus, a magnetic core structure comprising a plurality of stacked layers of laminations formed from magnetic strip material having a first preferred direction of orientation substantially parallel to the longitudinal dimension of said material and a second preferred direction substantially perpendicular to said first preferred direction, each layer of laminations including at least four laminations assembled around a substantially rectangular window, said plurality of layers being divided into one or more groups each including at least four layers, the first two joints between the adjoining edges of the laminations at the diagonally opposite outside corners of each layer being disposed at an oblique angle with respect to the first direction of orientation of the strip material from which the meeting laminations are formed, the second two joints between the other diagonally opposite corners of each layer being disposed substantially perpendicular with respect to each other and to the first direction of orientation of the strip material from which one of the meeting laminations is formed, the joints at each corner of said core structure in each of said groups including two parallel joints at an oblique angle and offset from each other to provide overlap between said parallel joints and two joints substantially perpendicular to each other and to the first direction of orientation of the strip material from which one of the meeting laminations is formed.

4. In an electrical apparatus, a magnetic core structure comprising a plurality of stacked layers of laminations formed from magnetic strip material having a first preferred direction of orientation substantially parallel to the longitudinal dimension of said material and a second preferred direction substantially perpendicular to said first preferred direction, each layer of laminations including at least four laminations assembled around a substantially rectangular window, each of said laminations being cut substantially perpendicular to said orientation at one end thereof and cut at an oblique angle with respect to said orientation for the major portion at the other end thereof, said plurality of layers being divided into one or more groups each including at least four layers, the first two joints between the adjoining edges of the laminations at the diagonally opposite outside corners of each layer being disposed at an oblique angle with respect to the first direction of orientation of the strip material from which the meeting laminations are formed, the second two joints between the other diagonally opposite corners of each layer being disposed substantially perpendicular with respect to each other and to the first direction of orientation of the strip material from which one of the meeting laminations is formed, the joints at each outside corner of said core structure in each of said groups including two parallel joints at an oblique angle and offset from each other to provide overlap between said parallel joints and two joints substantially perpendicular to each other and to the first direction of orientation of the strip material which one of the meeting laminations is formed, the width of the laminations on two opposite sides of each layer being larger than the width of the laminations on the other two opposite sides of each of said layers, the joints between the adjoining edges of the laminations in each layer being overlapped by the laminations in the adjacent layers.

5. In an electrical apparatus, a magnetic core structure comprising a plurality of stacked layers of laminations formed from magnetic strip material having a first preferred direction of orientation lengthwise of said material and a second preferred direction substantially perpendicular to said first preferred direction, each layer including at least four laminations assembled around a substantially rectangular window, each of said laminations being cut substantially perpendicular to said orientation at one end thereof and cut at an oblique angle with respect to said orientation for the major portion at the other end thereof, said plurality of layers including one or more groups each including at least four layers, the joints between the adjoining edges of the laminations of said layers in each group at each outside corner of said core being distributed into at least four planes, the first two of said four planes being at an oblique angle with respect to the first direction of orientation of the strip material from which the meeting laminations are formed, said first two planes being parallel to and offset from each other to provide overlap between the joints of said first two planes, the other two of said four planes being substantially perpendicular to each other and to the first direction of orientation of the strip material from which one of the meeting laminations is formed, the joints between the adjoining edges of the laminations in each layer being overlapped by the laminations in the adjacent layers.

6. In an electrical apparatus, a magnetic core structure comprising a plurality of stacked layers of laminations formed from magnetic strip material having a first preferred direction of orientation lengthwise of said material and a second preferred direction substantially perpendicular to said first preferred direction, each layer including at least four laminations assembled around a substantially rectangular window, each of said laminations being cut substantially perpendicular to said orientation at one end thereof and cut at an oblique angle with respect to said orientation for the major portion at the other end thereof, said plurality of layers including one or more groups each including at least four layers, the joints between the adjoining edges of the laminations of said layers in each group at each corner of said core being distributed into at least four planes, the first two of said four planes being at an oblique angle with respect to the first direction of orientation of the strip material from which the meeting laminations are formed, said first two planes being parallel to and offset from each other to provide overlap between the joints of said first two planes, the other two of said four planes being substantially perpendicular to each other and to the first direction of orientation of the strip material from which one of the meeting laminations is formed, the width of the laminations on two opposite sides of each layer being larger than the width of the laminations on the other two opposite sides of each layer, the joints between the adjoining edges of the laminations in each layer being overlapped by the laminations in the adjacent layers.

7. In an electrical apparatus, a magnetic core structure comprising a plurality of stacked layers of laminations formed from magnetic strip material having a first preferred direction of orientation substantially parallel to the sides of said material and a second preferred direction substantially perpendicular to said first preferred direction, each layer including a least three leg laminations and yoke laminations connecting the ends of said leg laminations to form a substantially rectangular core having two substantially rectangular windows, said plurality of layers being divided into one of more groups each including at least three layers, the joints between the adjoining edges of the laminations in two of the layers of each group at each outside corner of said core structure being disposed at an oblique angle with respect to the sides of the strip material from which the meeting laminations are formed, said two joints being substantially parallel to each other and offset from each other to provide overlap between said joints, the joints between the adjoining edges of the laminations in the third layer of each group at said corner being disposed substantially perpendicular to the sides and first direction of orientation of the strip material from which one of the meeting laminations is formed and substantially parallel to the second direction of orientation of the latter material, the joints between the adjoining edges of the laminations in each layer being overlapped by the laminations in the adjacent layers.

8. In an electrical apparatus, a magnetic core structure comprising a plurality of stacked layers of laminations formed from magnetic strip material having a first preferred direction of orientation substantially parallel to the sides of said material and a second preferred direction substantially perpendicular to said first preferred direction, each layer including at least three leg laminations and yoke laminations connecting the ends of said leg laminations to form a substantially rectangular core having two substantially rectangular windows, said plurality of layers being divided into one or bore groups each including at least three layers, the joints between the adjoining edges of the laminations in two of the layers of each group at each outside corner of said core structure being at an oblique angle with respect to the sides of the strip material from which the meeting laminations are formed, said two joints being substantially parallel to each other and offset from each other to provide overlap between said joints, the joints between the adjoining edges of the laminations in the third layer of each group at said corner being substantially perpendicular to the sides and to the first direction of orientation of the strip material from which one of the meeting laminations is formed, the width of said yoke laminations being larger than the width of said leg laminations.

9. In an electrical apparatus, a magnetic core structure comprising a plurality of stacked layers of laminations formed from magnetic strip material having a first preferred direction of orientation lengthwise of said material and a second preferred direction substantially perpendicular to said first preferred direction, each layer including first and second outer leg laminations and a center leg lamination and yoke laminations connecting the ends of said leg laminations together to form a substantially rectangular core having two substantially rectangular windows, the joints between the adjoining edges of said outer leg and yoke laminations of said layers being distributed into at least three planes at each corner of said core structure, two of said three planes being at an oblique angle with respect to the first direction of orientation of the strip material from which the meeting laminations are formed, said two planes being parallel to and offset from each other to provide overlap between the joints of said planes, the third of said three planes being perpendicular to the first direction of orientation of the strip material from which one of the meeting laminations is formed, the joints between said center leg and said yoke laminations of said layers being distributed into at least five planes at each end of said core structure, two of said five planes being substantially perpendicular to the first direction of orientation of the strip material from which said yoke laminations are formed and parallel to and offset from each other to provide overlap between the joints of said planes, two other of said five planes being at an oblique angle with respect to the first direction of orientation of the strip material from which the meeting laminations are formed and substantially perpendicular to each other, the last of said five planes being substantially perpendicular to the first direction of orientation of the strip material from which said center leg laminations are formed.

10. In an electrical apparatus, a magnetic core structure comprising a plurality of stacked layers of laminations formed from magnetic strip material having a first preferred direction of orientation lengthwise of said material and a second preferred direction substantially perpendicular to said first preferred direction, each layer including first and second outer leg laminations and a center leg lamination and yoke laminations connecting the ends of said leg laminations together to form a substantially rectangular core having two substantially rectangular windows, said plurality of layers comprising one or more groups each including at least three layers, the joints between the adjoining edges of said outer leg and yoke laminations of said layers in each group being distributed into at least three planes at each corner of said core structure, two of said three planes being at an oblique angle with respect to the first direction of orientation of the strip material from which the meeting laminations are formed, said two planes being parallel to and offset from each other to provide overlap between the joints of said planes, the third of said three planes being perpendicular to the first direction of orientation of the strip material from which one of the meeting laminations is formed, the joints between said center leg and said yoke laminations of said layers in each group being distributed into at least five planes at each end of said core structure, two of said five planes being substantially perpendicular to the first direction of orientation of the strip material from which said yoke laminations are formed and parallel to and offset from each other to provide overlap between the joints of said two planes, two other of said five planes being at an oblique angle with respect to the first direction of orientation of the strip material from which the meeting laminations are formed and substantially perpendicular to each other, the last of said five planes being substantially perpendicular to the first direction of orientation of the strip material from which said center leg laminations are formed.

11. In an electrical apparatus, a magnetic core structure comprising a plurality of stacked layers of laminations formed from magnetic strip material having a first preferred direction of orientation lengthwise of said material and a second preferred direction substantially perpendicular to said first preferred direction, each layer including first and second outer leg laminations and a center leg lamination and yoke laminations connecting the ends of said leg laminations together to form a substantially rectangular core having two substantially rectangular windows, said plurality of layers comprising one or more groups each including at least three layers, the joints between the adjoining edges of said outer leg and yoke laminations of said layers in each group being distributed into at least three planes at each corner of said core structure, two of said three planes being at an oblique angle with respect to the first direction of orientation of the strip material from which the meeting laminations are formed, said two planes being parallel to and offset from each other to provide overlap between the joints of said planes, the third of said three planes being perpendicular to the first direction of orientation of the strip material from which one of the meeting laminations is formed, the joints between said center leg and said yoke laminations of said layers in each group being distributed into at least five planes at each end of said core structure, two of said five planes being substantially perpendicular to the first direction of orientation of the strip material from which said yoke laminations are formed and parallel to and offset from each other to provide overlap between the joints of said two planes, two other of said five planes being at an oblique angle with respect to the first direction of orientation of the strip material from which the meeting laminations are formed and substantially perpendicular to each other, the last of said five planes being substantially perpendicular to the first direction of orientation of the strip material from which said center leg laminations are formed, the width of said yoke laminations being larger than the width of said leg laminations, the joints between the adjoining edges of the laminations in each layer being overlapped by the laminations in the adjacent layers.

12. In an electrical apparatus, a three-phase magnetic core structure comprising first and second magnetic core sections disposed side by side to form a substantially rectangular magnetic core, each of said sections including a plurality of stacked layers of laminations formed from magnetic strip material having a preferred direction of orientation lengthwise of said material, each layer including four yoke laminations and leg laminations connecting the ends of said yoke laminations to form a substantially rectangular magnetic core section having three substantially rectangular windows, said plurality of layers being divided into one or more groups each including at least three layers, the joints between the adjoining edges of the laminations in two of the layers of each group at each outside corner of said core sections being at an oblique angle with respect to the direction of orientation of the strip material from which the meeting laminations are formed, said two joints being substantially parallel to each other and offset from each other to provide overlap between said joints, the joint between the adjoining edges of the laminations in the third layer of each group at each of said corners being substantially perpendicular to the direction of orientation of the strip material from which one of the meeting laminations is formed, the joints between the adjoining edges of the laminations in each of said layers being overlapped by the laminations in the adjacent layers.

13. In an electrical apparatus, a three-phase magnetic core structure comprising first and second magnetic core sections disposed side by side to form a substantially rectangular magnetic core, each of said sections including a plurality of layers of magnetic strip material having a first preferred direction of orientation lengthwise of said material and a second preferred direction substantially perpendicular to said first preferred direction, each layer including first and second outer yoke and first and second intermediate yoke laminations and leg laminations connecting the ends of said yoke laminations to form a substantially rectangular core section having three substantially rectangular windows, the joints between the adjoining edges of said outer yoke and leg laminations of said layers at each corner of said core sections being distributed into at least three planes, two of said three planes being at an oblique angle with respect to the first direction of orientation of the strip material from which the meeting laminations are formed, said two planes being parallel to and offset from each other to provide overlap between the joints of said two planes, the third of said three planes being substantially perpendicular to the first direction of orientation of the material from which one of the meeting laminations is formed, the major portions of the joints between the adjoining edges of said intermediate yoke and leg laminations of said layers being distributed into at least five planes at each end of said core sections, two of said five planes being substantially perpendicular to the first direction of orientation of the material from which said leg laminations are formed and parallel to and offset from each other to provide overlap between the joints of said two planes, two other of said five planes being at an oblique angle with respect to the first direction of orientation of the strip material from which the meeting laminations are formed and substantially perpendicular to each other, the last of said five planes being substantially perpendicular to the first direction of orientation of the material from which said yoke laminations are formed.

14. In an electrical apparatus, a three-phase magnetic core structure comprising first and second magnetic core sections disposed side by side to form a substantially rectangular magnetic core, each of said sections including a plurality of layers of magnetic strip material having a first preferred direction of orientation lengthwise of said material and a second preferred direction substantially perpendicular to said first preferred direction, each layer including first and second outer yoke and first and second intermediate yoke laminations and leg laminations connecting the ends of said yoke laminations to form a substantially rectangular core section having three substantially rectangular windows, said plurality of layers comprising one or more groups each including at least three layers, the joints between the adjoining edges of said outer yoke and leg laminations of said layers in each group at each corner of said core sections being distributed into at least three planes, two of said three planes being at an oblique angle with respect to the first direction of orientation of the strip material from which the meeting laminations are formed, said two planes being parallel to and offset from each other to provide overlap between the joints of said planes, the third of said three planes being substantially perpendicular to the first direction of orientation of the material from which one of the meeting laminations is formed, the major portions of the joints between the adjoining edges of said intermediate yoke and leg laminations of said layers in each group being distributed into at least five planes at each end of said core sections, two of said five planes being substantially perpendicular to the first direction of orientation of the material from which said leg laminations are formed and parallel to and offset from each other to provide overlap between the joints of said two planes, two other of said five planes being at an oblique angle with respect to the first direction of orientation of the strip material from which the meeting laminations are formed and substantially perpendicular to each other, the last of said five planes being substantially perpendicular to the first direction of orientation of the material from which said yoke laminations are formed.

15. In an electrical apparatus, a magnetic core structure comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said leg laminations to form a substantially rectangular core section having three substantially rectangular windows, said plurality of layers including one or more groups each including at least three layers, the joints between the adjoining edges of the laminations at each of the outside corners of two of the layers of each group being at an oblique angle with respect to the first direction of orientation of the strip material from which the meeting laminations are formed, the joints at each corresponding outside corner of said first two layers being parallel to and offset from each other to provide overlap between said joints, the joints between the adjoining edges of the laminations at each of the outside corners of the third layer in each group being substantially perpendicular to the first direction of the strip material from which one of the meeting laminations is formed to provide overlap for the joints at each corner of the adjacent layers.

16. In an electrical apparatus, a magnetic core structure comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said leg laminations to form a substantially rectangular core section having three substantially rectangular windows, said plurality of layers including one or more groups each including at least three layers, the joints between the adjoining edges of the laminations at each of the outside corners of two of the layers of each group being at an oblique angle with respect to the first direction of orientation of the strip material from which the meeting laminations are formed, the joints at each corresponding outside corner of said first two layers being parallel to and offset from each other to provide overlap between said joints, the joints between the adjoining edges of the laminations at each of the outside corners of the third layer in each group being substantially perpendicular to the first direction of the strip material from which one of the meeting laminations is formed to provide overlap for the joints at each corner of the adjacent layers, the layers of each of said groups of layers being stacked in a predetermined sequence.

17. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a preferred direction of orientation lengthwise of said material, each layer including at least four yoke laminations and leg laminations connecting the ends of said yoke laminations to form a substantially rectangular core section having three substantially rectangular windows, said plurality of layers including one or more groups of layers each including at least three layers, the joints between the adjoining edges of the laminations at two of the diagonally opposite outside corners of two of the layers of each group being disposed at an oblique angle with respect to the direction of orientation of the strip material from which the meeting laminations are formed, the joints between the adjoining edges of the laminations at the other two diagonally opposite corners of said two layers of each group being substantially perpendicular to the direction of orientation of the strip material from which one of the meeting laminations is formed, the major portion of the joints between the adjoining edges of the laminations at each outside corner of the third layer of each group being at an oblique angle with respect to the direction of orientation of the strip material from which the meeting laminations are formed, the major portion of the joints of said third layer being parallel to and offset from the oblique joints at the corresponding outside corners of the other layers of each group to provide overlap between said joints of said layers in each group, the joints between the adjoining laminations of each layer being overlapped by the laminations in the adjacent layers.

18. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first perferred direction of orientation lengthwise of said material and a second preferred direction substantially perpendicular to said first preferred direction, each layer including at least four yoke laminations and leg laminations connecting the ends of said yoke laminations to form a substantially rectangular core section having three substantially rectangular windows, said plurality of layers including one or more groups of layers each including at least three layers, the joints between the adjoining edges of the laminations at two of the diagonally opposite outside corners of two of the layers of each group being disposed at an oblique angle with respect to the first direction of orientation of the strip material from which the meeting laminations are formed, the joints between the adjoining edges of the laminations at the other two diagonally opposite corners of said two layers of each group being substantially perpendicular to the first direction of orientation of the strip material from which one of the meeting laminations is formed, the major portion of the joints between the adjoining edges of the laminations at each outside corner of the third layer of each group being at an oblique angle with respect to the first direction of orientation of the strip material from which the meeting laminations are formed, the major portions of the joints of said third layer being parallel to and offset from the oblique joints at the corresponding outside corners of the other layers of each group to provide overlap between said joints in the layers of each group, two of the three joints at each outside corner of each core section being of the oblique type and one being of the perpendicular type.

19. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said yoke laminations to form a substantially rectangular core section having three substantially rectangular windows, said plurality of layers including one or more groups of layers each including at least three layers, the joints between the adjoining edges of the laminations at two of the diagonally opposite outside corners of two of the layers of each group being disposed at an oblique angle with respect to the first direction of orientation of the strip material from which the meeting laminations are formed, the joints between the adjoining edges of the laminations at the other two diagonally opposite corners of said two layers of each group being substantially perpendicular to the first direction of orientation of the strip material from which one of the meeting laminations is formed, one end of each of the laminations of said two layers being cut at an oblique angle and one end cut substantially perpendicular with respect to the first direction of orientation of the strip material from which said laminations are formed, the major portion of the joints between the adjoining edges of the laminations at each outside corner of the third layer of each group being at an oblique angle with respect to the first direction of orientation of the strip material from which the meeting laminations are formed, the major portions of the joints of said third layer being parallel to and offset from the oblique joints at the corresponding outside corners of the other layers of each group to provide overlap between said joints in the layers of each group, the joints between the adjoining laminations of each layer being overlapped by the laminations in the adjacent layers.

20. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said yoke laminations to form a substantially rectangular core section having three substantially rectangular windows, said plurality of layers including one or more groups of layers each including at least three layers, the joints between the adjoining edges of the laminations at two of the diagonally opposite outside corners of two of the layers of each group being disposed at an oblique angle with respect to the first direction of orientation of the strip material from which the meeting laminations are formed, the joints between the adjoining edges of the laminations at the other two diagonally opposite corners of said two layers of each group being substantially perpendicular to the first direction of orientation of the strip material from which one of the meeting laminations is formed, one end of each of the laminations of said two layers being cut at an oblique angle and one end cut substantially perpendicular with respect to the first direction of orientation of the strip material from which said laminations are formed, the major portions of the joints between the adjoining edges of the laminations at each outside corner of the third layer of each group being at an oblique angle with respect to the first direction of orientation of the strip material from which the meeting laminations are formed, the major portion of the joints of said third layer being parallel to and offset from the oblique joints at the corresponding outside corners of the other layers of each group to provide overlap between said joints in the layers of each group, two of the three joints at each outside corner of each core section being of the oblique type and one being of the perpendicular type.

21. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said yoke laminations to form a substantially rectangular core section having three substantially rectangular windows, said plurality of layers including one or more groups of layers each including at least three layers, the joints between the adjoining edges of the laminations at two of the diagonally opposite outside corners of two of the layers of each group being disposed at an oblique angle with respect to the first direction of orientation of the strip material from which the meeting laminations are formed, the joints between the adjoining edges of the laminations at the other two diagonally opposite corners of said two layers of each group being substantially perpendicular to the first direction of orientation of the strip material from which one of the meeting laminations is formed, the major portion of the joints between the adjoining edges of the laminations at each outside corner of the third layer of each group being at an oblique angle with respect to the first direction of orientation of the strip material from which the meeting laminations are formed, the major portions of the joints of said third layer being parallel to and offset from the oblique joints at the corresponding outside corners of the other layers of each group to provide overlap between said joints in the layers of each group, at least the major portion of each end of said yoke laminations of said third layer being cut on an oblique angle with respect to the first direction of orientation of the strip material from which said yoke laminations are formed.

22. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said yoke laminations to form a substantially rectangular core section having three substantially rectangular windows, said plurality of layers including one or more groups of layers each including at least three layers, the joints between the adjoining edges of the laminations at two of the diagonally opposite outside corners of two of the layers of each group being disposed at an oblique angle with respect to the first direction of orientation of the strip material from which the meeting laminations are formed, the joints between the adjoining edges of the laminations at the other two diagonally opposite corners of said two layers of each group being substantially perpendicular to the first direction of orientation and substantially parallel to the second direction of orientation of the strip material from which one of the melting laminations is formed, one end of each of the laminations of said two layers being cut at an oblique angle and one end cut substantially perpendicular with respect to the first direction of orientation of the strip material from which said laminations are formed, the major portions of the joints between the adjoining edges of the laminations at each outside corner of the third layer of each group being at an oblique angle with respect to the first direction of orientation of the strip material from which the meeting laminations are formed, the major portions of the joints of said third layer being parallel to and offset from the oblique joints at the corresponding outside corners of the other layers of each group to provide overlap between said joints in the layers of each group, at least the major portion of each end of said yoke laminations of said third layer being cut on an oblique angle with respect to the first direction of orientation of the strip material from which said yoke laminations are formed.

23. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said yoke laminations to form a substantially rectangular core section having three substantially rectangular windows, said plurality of layers including one or more groups of layers each including at least three layers, at least the major portion of the joints between the adjoining edges of the laminations at the outside corners of each layer being at an oblique angle with respect to the first direction of orientation of the strip material from which the meeting laminations are formed, the joint between the adjoining edges of the laminations of one layer of each group at each outside corner of each core section being along a line of junction extending from the nearest corner of the adjacent window to said outside corner, the major portion of the joints between the adjoining edges of the laminations of the other two layers of each group at each corresponding corner of said layers being parallel to and offset from the corresponding joint of the first mentioned layer on opposite sides of the latter joint to provide overlap between the different joints of the three layers in each group at each outside corner of said core sections.

24. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, each layer including at least four yoke laminations and leg laminations connecting the ends of said yoke laminations to form a substantially rectangular core section having three substantially rectangular windows, said plurality of layers including one or more groups of layers each including at least three layers, at least the major portion of the joints between the adjoining edges of the laminations at the outside corners of each layer being at an oblique angle with respect to the first direction of orientation of the strip material from which the meeting laminations are formed, the joint between the adjoining edges of the laminations of one layer of each group at each outside corner of each core section being along a line of junction extending from the nearest corner of the adjacent window to said outside corner, two of the diagonally opposite joints at the outside corners of two of the layers in each group being of the latter type, the major portion of the joints between the adjoining edges of the laminations of the other two layers of each group at each corresponding corner of said layers being parallel to and offset from the corresponding joint of the first mentioned layer on opposite sides of the latter joint to provide overlap between the different joints of the three layers in each group at each outside corner of said core sections.

25. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, said plurality of layers comprising one or more groups each including at least three layers, each of said layers including at least four yoke laminations and leg laminations connecting said yoke laminations together to form a substantially rectangular core section having three substantially rectangular windows, the major portion of the joints between the adjoining edges of the laminations of said layers in each group at each outside corner of said core sections being distributed into at least three planes, the first of said planes at each outside corner extending from the nearest corner of the adjacent window to said outside corner at an oblique angle with respect to the first direction of orientation of the strip material from which the meeting laminations are formed, the second and third of said planes being substantially parallel to and displaced from said first plane by substantially equal amounts on opposite sides of said first plane to provide overlap between the major portions of the joints lying in said three planes.

26. In an electrical apparatus, a magnetic core structure of the shell form type comprising first and second magnetic core sections disposed side by side to form a substantially rectangular magnetic core, each of said sections including a plurality of stacked layers of laminations formed from magnetic strip material having a first preferred direction of orientation lengthwise of said material and a second preferred direction substantially perpendicular to said first preferred direction, said plurality of layers comprising one or more groups each including at least three layers, each of said layers including at least four yoke laminations and leg laminations connecting said yoke laminations together to form a substantially rectangular core section having three substantially rectangular windows, the major portion of the joints between the adjoining edges of the laminations of said layers in each group at each outside corner of said core sections being distributed into at least three planes, the first of said planes at each outside corner extending from the nearest corner of the adjacent window to said outside corner at an oblique angle with respect to the first direction of orientation of the strip material from which the meeting laminations are formed, two of the diagonally opposite joints in two of the layers in each group lying in said first plane at the associated outside corner of each of said core sections, the second and third of said planes being substantially parallel to and displaced from said first plane by substantially equal amounts on opposite sides of said first plane to provide overlap between the major portions of the joints lying in said three planes.

References Cited in the file of this patent

UNITED STATES PATENTS

| | | |
|---|---|---|
| 1,404,826 | Alden | Jan. 31, 1922 |
| 2,300,964 | Putman | Nov. 3, 1942 |

FOREIGN PATENTS

| | | |
|---|---|---|
| 127,691 | Sweden | Mar. 21, 1950 |
| 699,549 | Great Britain | Nov. 11, 1953 |
| 77,182 | Denmark | Mar. 1, 1954 |